United States Patent
Chen et al.

(10) Patent No.: US 10,027,495 B2
(45) Date of Patent: Jul. 17, 2018

(54) IDLE SCHEDULING METHOD AND HOME NETWORK NODE

(71) Applicant: ZTE CORPORATION, Shenzhen, Guangdong Province (CN)

(72) Inventors: Wu Chen, Shenzhen (CN); Biduo Chen, Shenzhen (CN); Aijun Xu, Shenzhen (CN); Weiliang Zhang, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 186 days.

(21) Appl. No.: 14/781,039

(22) PCT Filed: Jul. 31, 2013

(86) PCT No.: PCT/CN2013/080538
§ 371 (c)(1),
(2) Date: Sep. 29, 2015

(87) PCT Pub. No.: WO2013/185710
PCT Pub. Date: Dec. 19, 2013

(65) Prior Publication Data
US 2016/0043874 A1     Feb. 11, 2016

(30) Foreign Application Priority Data
Apr. 2, 2013   (CN) .......................... 2013 1 0113315

(51) Int. Cl.
*H04L 12/12*      (2006.01)
*G06F 1/32*       (2006.01)
(Continued)

(52) U.S. Cl.
CPC .......... *H04L 12/12* (2013.01); *H04L 12/2803* (2013.01); *H04L 47/50* (2013.01);
(Continued)

(58) Field of Classification Search
CPC ....... G06F 1/3203; H04L 12/12; Y02B 60/32; Y02B 60/34; Y02B 60/35
See application file for complete search history.

(56) References Cited

U.S. PATENT DOCUMENTS

2006/0218419 A1    9/2006  Iwamura et al.
2010/0115130 A1    5/2010  Jun et al.
(Continued)

FOREIGN PATENT DOCUMENTS

CN    101442459 A    5/2009
CN    102577297 A    7/2012
(Continued)

OTHER PUBLICATIONS

ITU-Telecommunication Standardization Sector; TN,Mar. 16-20, 2009; DS2 et al G.hn MAC support for low-power mode.

*Primary Examiner* — Ayaz Sheikh
*Assistant Examiner* — Debebe Asefa
(74) *Attorney, Agent, or Firm* — Ling Wu; Stephen Yang; Ling and Yang Intellectual Property (57) ABSTRACT

The embodiment of the present document relates to an idle scheduling method and a home network node, wherein the method includes: a domain master node performing an idle scheduling on intra-domain ordinary nodes according to an idle scheduling policy; when the domain master node determines that all the intra-domain ordinary nodes are in a energy-saving mode according to the idle scheduling information of all the intra-domain ordinary nodes, the domain master node entering into the energy-saving mode, and when all the intra-domain ordinary nodes are in an idle state, the domain master node being in the idle state.

11 Claims, 4 Drawing Sheets

(51) Int. Cl.
*H04L 12/863* (2013.01)
*H04L 12/28* (2006.01)
(52) U.S. Cl.
CPC ............ *G06F 1/3203* (2013.01); *Y02D 50/20* (2018.01); *Y02D 50/40* (2018.01); *Y02D 50/42* (2018.01)

(56) References Cited

U.S. PATENT DOCUMENTS

| | | | | |
|---|---|---|---|---|
| 2012/0087229 | A1* | 4/2012 | Mantri | H04W 28/18 370/201 |
| 2013/0036417 | A1* | 2/2013 | Chen | G06F 9/5077 718/1 |
| 2013/0238919 | A1* | 9/2013 | Ponmudi | H04W 52/0216 713/323 |

FOREIGN PATENT DOCUMENTS

| | | |
|---|---|---|
| CN | 102724668 A | 10/2012 |
| CN | 102932958 A | 2/2013 |
| CN | 103209498 A | 7/2013 |
| WO | WO2011041905 A | 4/2011 |

\* cited by examiner

IDLE SCHEDULING METHOD AND HOME NETWORK NODE

TECHNICAL FIELD

The present document relates to the field of communication, and more particularly, to an idle scheduling method and a home network node.

BACKGROUND OF THE INVENTION

G.hn is the latest ITU-T home network standard, which provides a networking technology within the home user network based on power lines, telephone lines, coaxial lines. The G.hn defines four power modes in total. Transceiver should work in one of the following modes during the boot-up:

Full power mode (L0): in this mode, data transmission can reach the maximum rate. Power consumption is only limited by the power spectral density (PSD).

High-efficiency Mode (L1): in this mode, power consumption is reduced by limiting the media access to part of the MAC (Medium/Media Access Control) cycle. The maximum data rate is supported.

Low-power mode (L2): in this mode, power consumption is reduced by compressing the media access in a plurality of MAC cycles, and only a limited data rate is supported.

Idle mode (L3): in this mode, the power consumption is minimized by compressing the media access in a long period of MAC cycle. The transceiver is booted up and physically connected to the home network, but no data other than control messages are sent or received.

In this text, the power modes are divided into non-energy-saving mode and energy-saving mode, in which the full-power mode (L0) is the non-energy-saving mode, and the high-efficiency mode (L1), the low-power mode (L2) and the idle mode (L3) are collectively called the energy-saving mode.

The G.hn defines the concept of logical network "domain", and the domain is identified with a domain name (referred to as DN), in general, different homes use different domain names, which is similar to the SSID (Service Set Identifier) of WiFi. Each domain has one domain master node (Domain Master) and at least one ordinary node. The domain master node is in charge of management tasks such as access, exit, authentication, and broadband distribution of other intra-domain ordinary nodes. The other nodes can send messages to the domain master node and request to be in idle in multiple MAC cycles.

A node in the idle state does not perform any interactions, so that the domain master node should not allocate any dedicated resources (such as contention-free time slot (CFTS) or contention-free transmission opportunity (CFTXOP) to this node. However, the node in the idle state can still transmit within the TXOP (Transmission Opportunity) or time slot in which the MAP allows it to transmit. If the transmission of the node in the idle state requests to be acknowledged, the node should be prepared to receive an ACK frame from a target node. The target node can send an acknowledgment to the node in the idle state. Except this case, other nodes cannot send messages to the node in the idle state.

A node can request for two kinds of long-term idle scheduling: if the node expects that the scheduling only takes effect once, it needs to specify the length of the requested idle period. If the node expects that the scheduling takes effect for many times, it needs to specify the length of the requested idle period and the length of the subsequent active period. In this case, the idle period and the subsequent active period will repeat until the domain master node is canceled or changed. If the domain master node accepts the request, it shall inform the node of the recommended idle scheduling. For the long-term idle scheduling, the starting time and length of the idle period and the length of the subsequent active period (if available) should be identified in the auxiliary information field of the MAP message. During the active period, the node can send other idle scheduling to change the current idle scheduling, or send a message to cancel the current idle scheduling. The domain master node can send different idle scheduling at any time to terminate or change the current idle scheduling.

A node can also request for a short-term idle scheduling, and can be in the idle state and the active state within time segments of one MAC cycle respectively.

In the conventional energy-saving mode, there is no specific description about how the domain master node saves energy. At the same time, the start times and the sleeping lengths of ordinary nodes may not be the same, and the energy-saving may request to change or cancel the sleeping plan at any time, therefore the domain master node is hard to save energy during the sleeping.

SUMMARY

The embodiment of the present document is to provide an idle scheduling method and a home network node to solve the problem that the existing domain master node cannot meet energy-saving requirements.

An idle scheduling method provided in an embodiment of the present document, comprises:

a domain master node performing an idle scheduling on intra-domain ordinary nodes according to an idle scheduling policy;

when the domain master node determines that all the intra-domain ordinary nodes are in an energy-saving mode based on idle scheduling information of all the intra-domain ordinary nodes, the domain master node entering into the energy-saving mode, and when all the intra-domain ordinary nodes are in an idle state, the domain master node being in the idle state.

Preferably, the domain master node performing an idle scheduling on the intra-domain ordinary nodes according to the idle scheduling policy comprises:

determining the energy-saving mode of an intra-domain ordinary node to be scheduled;

obtaining idle scheduling information, which is valid for a plurality of times, of intra-domain ordinary nodes which are already in the energy-saving mode;

generating idle scheduling information of the intra-domain ordinary node to be scheduled according to the obtained idle scheduling information.

Preferably, the idle scheduling information of the intra-domain ordinary node to be scheduled synchronizes the idle state of the intra-domain ordinary node to be scheduled with the idle state of intra-domain ordinary nodes in the same energy-saving mode.

Preferably, when determining that the energy-saving mode of the intra-domain ordinary node to be scheduled is the idle mode, and there is no idle scheduling information of intra-domain ordinary nodes in the idle mode, and when the idle scheduling information of the intra-domain ordinary node to be scheduled makes the intra-domain ordinary node to be scheduled be in an active state, intra-domain ordinary nodes which are already in a low-power mode are also in the active state.

Preferably, the energy-saving mode comprises a low-power mode (L2) and an idle mode (L3), in particular:

when determining that all the intra-domain ordinary nodes are in the low-power mode (L2) and the idle scheduling information is valid for a plurality of times, the domain master node enters into the low-power mode;

when determining that all the intra-domain ordinary nodes are in the idle mode (L3) and the idle scheduling information is valid for a plurality of times, the domain master node enters into the idle mode;

when determining that part of the intra-domain ordinary nodes are in the low-power mode (L2), and rest of the intra-domain ordinary nodes are in the idle mode (L3) and the idle scheduling information is valid for a plurality of times, the domain master node enters into the low-power mode.

Preferably, the domain master node and intra-domain ordinary nodes comprise receivers and transmitters, when being in the idle state, the domain master node and the intra-domain ordinary nodes turn off the receivers and the transmitters or only turn off the transmitters.

Preferably, the domain master node uses buffers to buffer downlink data during a period that the transmitter of the domain master node is turned off or data sent to the intra-domain ordinary nodes which are in the idle state and whose receivers are turned off.

A home network node provided in an embodiment of the present document comprises: an intra-domain idle scheduling unit, configured to: when the home network node is a domain master node, perform an idle scheduling on intra-domain ordinary nodes according to an idle scheduling policy;

a domain master idle scheduling unit, configured to: when the home network node is a domain master node, when determining that all the intra-domain ordinary nodes are in an energy-saving mode according to idle scheduling information of all the intra-domain ordinary nodes, make the domain mater node enter into the energy-saving mode, and when determining that all the intra-domain ordinary nodes are in an idle state, make the domain master node be in the idle state.

Preferably, the intra-domain idle scheduling unit comprises:

an energy-saving mode determining module, configured to: determine the energy-saving mode of an intra-domain ordinary node currently to be scheduled;

an idle scheduling information obtaining module, configured to: obtain idle scheduling information, which is valid for a plurality of times, of intra-domain ordinary nodes which are already in the energy-saving mode;

an idle scheduling information generating module, which is configured to: generate idle scheduling information of the intra-domain ordinary node to be scheduled according to the obtained idle scheduling information.

Preferably, the idle scheduling information of the intra-domain ordinary node to be scheduled synchronizes the idle state of the intra-domain ordinary node to be scheduled with the idle state of intra-domain ordinary nodes that are already in the same energy-saving mode.

Preferably, when determining that the energy-saving mode of the intra-domain ordinary node to be scheduled is an idle mode, and there is no idle scheduling information of intra-domain ordinary nodes in the idle mode, and the idle scheduling information of the intra-domain ordinary node to be scheduled makes the intra-domain ordinary node to be scheduled be in an active state, intra-domain ordinary nodes which are already in a low-power mode are also in the active state.

Preferably, the energy-saving mode comprises the low-power mode (L2) and the idle mode (L3), and the domain master idle scheduling unit is configured to:

when determining that all the intra-domain ordinary nodes are in the low-power mode (L2) and the idle scheduling information is valid for a plurality of times, make the domain master node enter into the low-power mode;

when determining that all the intra-domain ordinary nodes are in the idle mode (L3) and the idle scheduling information is valid for a plurality of times, make the domain master node enter into the idle mode;

when determining that part of the intra-domain ordinary nodes are in the low-power mode (L2), rest of the intra-domain ordinary nodes are in the idle mode (L3) and the idle scheduling information is valid for a plurality of times, make the domain master node enter into the low-power mode.

Preferably, the home network node further comprises a receiver and a transmitter, when the home network node is in the idle state, the receiver and the transmitter are turned off or only the transmitter is turned off.

Preferably, the home network node further comprises buffers, which are configured to: when the home network node is the domain master node, buffer downlink data during a period that the transmitter of the domain master node is turned off or data sent to intra-domain ordinary nodes which are in the idle state and whose receivers are turned off.

Preferably, the home network node further comprises: a domain master transfer unit, which is configured to: when working as the domain master node and meeting a domain master transfer condition, transfer the domain master node;

a domain master transfer judging unit, which is configured to: judge whether the domain master transfer condition is met.

Preferably, the domain master transfer condition refers to that a traffic of an Ethernet interface within a predetermined time period is less than a predetermined threshold.

Preferably, the home network node further comprises: a domain master contention unit, which is configured to: contend for the domain master node according to a domain master contention rule based on triggering of a domain master contention event, and the domain master contention event comprises that the domain master node is offline, a former domain master node is online again, or the former domain master node transfers from the energy-saving mode to a non-energy-saving mode.

The embodiment of the present document provides an energy-saving mechanism applied to the domain master node, the domain master node performs an idle scheduling on intra-domain ordinary nodes according to the idle scheduling policy, and the domain master node enters into the idle state when all the intra-domain ordinary nodes enter into the idle mode, which can reduce power consumption of the domain master node, meet the energy-saving requirements, improve efficiency of the idle scheduling and enhance the energy-saving effect in the idle mode on the premise of meeting the function of the domain master node.

PREFERRED EMBODIMENTS OF THE INVENTION

Hereinafter, in conjunction with the accompanying drawings, the embodiments of the present document will be described in detail. It should be noted that, in the case of no conflict, embodiments and features in the embodiments in the present application can be combined with each other.

Figure 1:
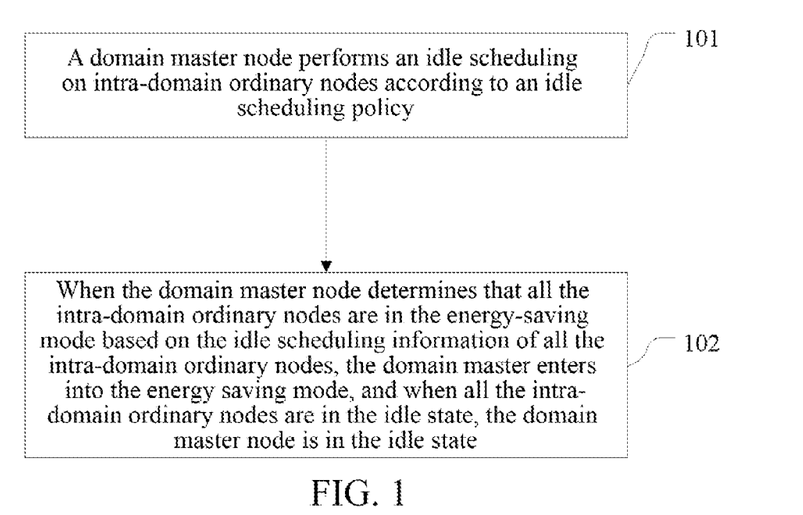
FIG. 1 is a schematic diagram of an idle scheduling method embodiment in accordance with the present document.

The idle scheduling method according to the embodiment of the present document, which is used in a home network, and as shown in FIG. 1, comprises:

in step 101, a domain master node performs an idle scheduling on intra-domain ordinary nodes according to an idle scheduling policy;

One home network domain comprises multiple intra-domain ordinary nodes which are connected together with one medium, wherein one intra-domain ordinary node is the domain master node. Various intra-domain ordinary nodes communicate with each other through this medium. Intra-domain ordinary nodes within different domains communicate with each other via inter-domain bridges.

As described in the background of the invention, the energy-saving mode of the intra-domain ordinary nodes (including the intra-domain ordinary nodes and the domain master node) comprises the high-efficiency mode (L1), the low-power mode (L2) and the idle mode (L3), it is understandable that, when the home network node is in the L2 mode or the L3 mode, the energy-saving effect is relatively obvious.

When the intra-domain ordinary nodes are in the energy-saving mode, there are two states, that is, the idle state and the active state, wherein the time period from the starting time of an idle state to the ending time of an adjacent active state is called a cycle.

The domain master node can perform an idle scheduling on the intra-domain ordinary node actively or according to a request of the intra-domain ordinary node.

In step 102, when the domain master node determines that all the intra-domain ordinary nodes are in the energy-saving mode based on the idle scheduling information of all the intra-domain ordinary nodes, the domain master node enters into the energy-saving mode, and when all the intra-domain ordinary nodes are in the idle state, the domain master node is in the idle state.

During the period that the domain master node node is in the idle state and the active state, it can ensure that intra-domain ordinary nodes can synchronize with the MAC cycle, and can register and re-register.

After the domain master node sends a message of entering into the idle state to all the intra-domain ordinary nodes, or receives a message that all the intra-domain ordinary nodes enter into the idle state, the domain master node enters into the idle state. In the idle state, the domain master node can turn off the transmitter and the receiver, and the domain master node has some buffers to store downlink data to ensure that downlink packets are not lost during the time period that the transmitter and receiver of the domain master node are turned off, until the idle time of the ordinary node expires or an idle state cancellation request is sent, or external traffic information is received, or the idle time of the domain master node expires. At this time, the domain master node ends the idle state.

During the idle state, the domain master node may also be in a dozing mode, namely the receiver is turned on, but the transmitter is turned off. The designer can decide to use which specific mode.

If receiving the external traffic information, offline nodes are awaken to be online.

After an intra-domain ordinary node enters into the idle state and turns off the transmitter and receiver, the domain master node detects that the intra-domain ordinary node turns off the receiver, and it needs to be able to identify the node sleep and offline, and when the intra-domain ordinary node is sleeping, it remains the state of the intra-domain ordinary node, buffers the data sent to the intra-domain ordinary node, and after the node wakes up, it sends the buffered packets to the intra-domain ordinary node, if the intra-domain ordinary node has not waken up within the preset sleeping time, the domain master node considers that the intra-domain ordinary node is offline.

Figure 2:
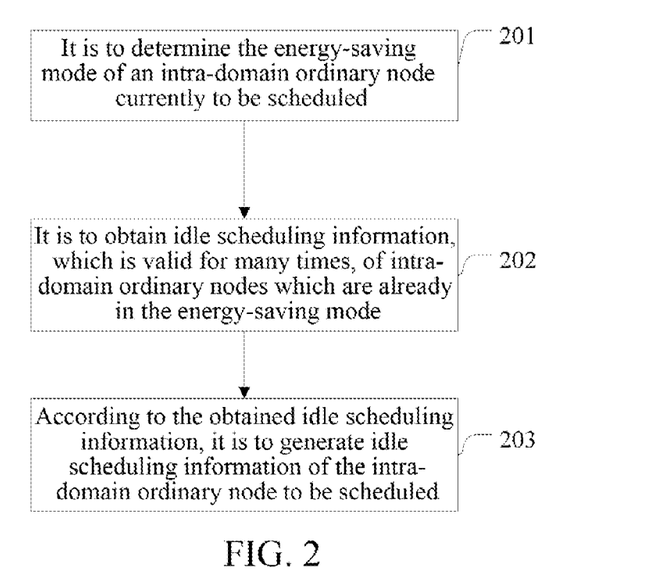
FIG. 2 is a schematic diagram of the process of a domain master node performing an idle scheduling on intra-domain ordinary nodes according to an idle scheduling policy.

As shown in FIG. 2, the step 101 of the domain master node performing an idle scheduling on intra-domain ordinary nodes according to the idle scheduling policy comprises:

in step 201, it is to determine the energy-saving mode of an intra-domain ordinary node currently to be scheduled;

in step 202, it is to obtain idle scheduling information, which is valid for a plurality of times, of intra-domain ordinary nodes which are already in the energy-saving mode;

in step 203, according to the obtained idle scheduling information, it is to generate idle scheduling information of the intra-domain ordinary node to be scheduled.

Preferably, the idle scheduling information of the intra-domain ordinary node to be scheduled synchronizes the idle state of the intra-domain ordinary node to be scheduled with the idle state of intra-domain ordinary nodes already in the same energy-saving mode.

Specifically, if the intra-domain ordinary nodes which request for the L2 or L3 energy-saving mode expect that the scheduling is valid for a plurality of times, the idle scheduling under the same energy-saving mode must be synchronized. That is, the starting time and length of the idle state as well as the length of the following active state of the intra-domain ordinary nodes which request late should be consistent with the starting time and length of the idle state of a cycle as well as the length of the following active state of the intra-domain ordinary nodes which enter into the equivalent energy-saving mode early.

Figure 3:
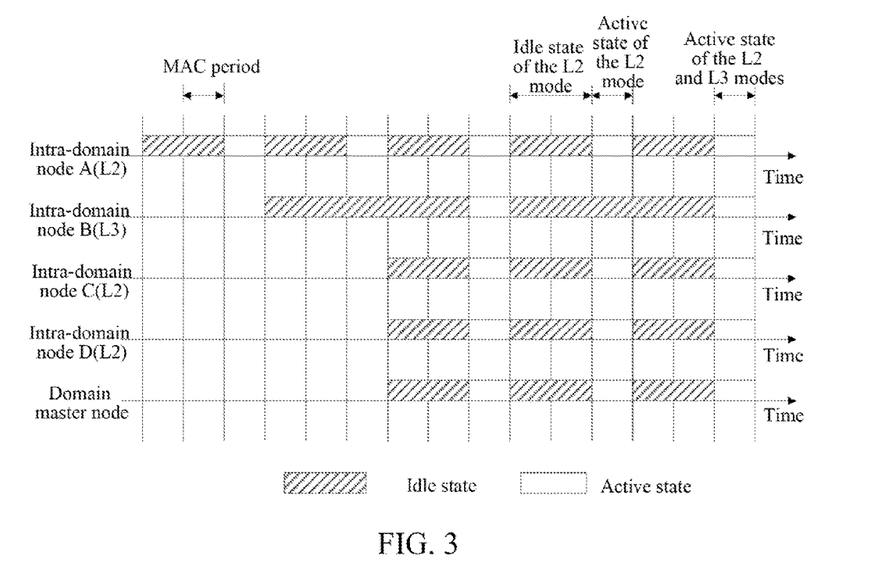
FIG. 3 is a schematic diagram of the state in which each intra-domain ordinary node enters into the energy-saving mode in accordance with an embodiment of the present document.

As shown in FIG. 3, when scheduling the intra-domain ordinary nodes C and D, the domain master node synchronizes the idle scheduling of the intra-domain ordinary nodes C and D which enter into the L2 mode late with the idle scheduling of the intra-domain ordinary node A.

When determining that the energy-saving mode of the intra-domain ordinary node to be scheduled is the idle mode and there is no idle scheduling information of the intra-domain ordinary nodes in the idle mode, and when the idle scheduling information of the intra-domain ordinary nodes to be scheduled makes the intra-domain ordinary node to be scheduled be in the active state, intra-domain ordinary nodes in the low-power mode are also in the active state.

Specifically, when the intra-domain ordinary nodes which enter into the L3 energy-saving mode and whose scheduling is valid for a plurality of times are in the active state, the intra-domain ordinary nodes which enter into the L2 energy-saving mode must also be in the active state.

As shown in FIG. 3, when performing a scheduling on the intra-domain ordinary node B, the domain master node synchronizes the intra-domain ordinary node B which enters into the L3 mode with the intra-domain ordinary node A which enters into the L2 mode early in the active state.

Figure 4:
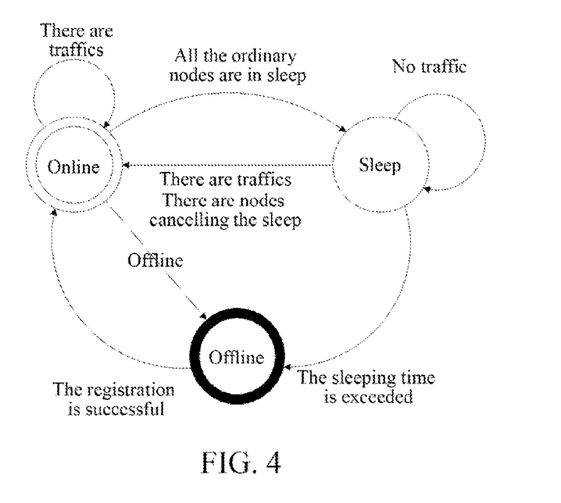
FIG. 4 is a schematic diagram of three states of a domain master node in accordance with an embodiment of the present document.

As shown in FIG. 4, the domain master node is in 3 states, online, idle (that is, sleeping) and offline. When the domain master node is online, if the nodes are sleeping, the domain master node has no traffic to receive, and the domain master node enters into the sleeping state. When the domain master node is sleeping, the downlink traffic is buffered. If the domain master node has not woken up within the preset sleeping time, it is considered that the domain master node has been offline.

In the following, the L2 mode or the L3 mode is taken as an example to illustrate step 102.

When determining that the intra-domain ordinary nodes are in the low-power mode (L2) and the idle scheduling information is valid for a plurality of times, the domain master node enters into the low-power mode;

when determining that the intra-domain ordinary nodes are in the idle mode (L3) and the idle scheduling information is valid for a plurality of times, the domain master node enters into the idle mode;

when determining that part of the intra-domain ordinary nodes are in the low-power mode (L2), and the rest intra-domain ordinary nodes are in the idle mode (L3) and the idle scheduling information is valid for a plurality of times, the domain master node enters into the low-power mode.

The domain master node and intra-domain ordinary nodes comprise receivers and transmitters, when the domain master node and the intra-domain ordinary nodes are in the idle state, the domain master node and the intra-domain ordinary nodes turn off the receivers and the transmitters or only turn off the transmitters.

The domain master node uses buffers to buffer downlink data during the period that the transmitter of the domain master node is turned off or data sent to the nodes which are in the idle state and whose receivers are turned off.

If the domain master node does not participate in the communication between intra-domain ordinary nodes, the domain master node can transfer the domain master node function to a node in the communication, and the domain master node becomes a node and enters into the energy-saving mode.

Figure 5:
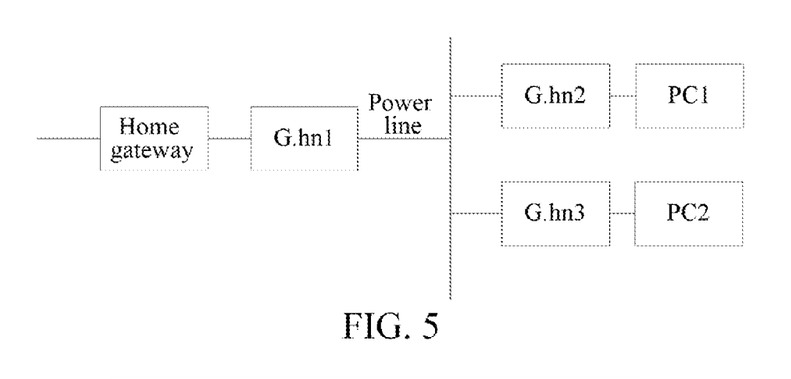
FIG. 5 is a schematic diagram of a home network framework in accordance with an embodiment of the present document.

In the following, the home network architecture shown in FIG. 5 is taken as an example to describe the method in the embodiment of the present document in detail.

FIG. 5 is a typical home application networking, HGW is a home gateway, PC1 and PC2 are two PCs which are connected to the HGW through a G.hn network composed of three G.hn devices: G.hn1, G.hn2 and G.hn3, to achieve the purpose of the PC accessing the Internet, wherein G.hn1 is the domain master node.

The first application scenario: the domain master node sleeps, and the transmitter and receiver are turned off.

In step 1, the user turns on all devices after work, the PC1 and the PC2 access the Internet, and all the G.hn devices work in the L0 state;

in step 2, the two PCs are in the idle state and in the offline state respectively, the G.hn2 and the G.hn3 apply to be in the energy-saving mode, that is, periodic sleep, after the G.hn1 agrees, the G.hn2 and the G.hn3 enter into the L3 energy-saving mode, the transmitters and receivers in the idle state are turned off; or the domain master node detects that the two PCs have low traffic, then informs the G.hn2 and the G.hn3 to enter into the energy-saving mode;

in step 3, the G.hn1 enters into the L3 energy-saving mode, and turns off the transmitter and the receiver in the idle state.

The second application scenario—domain master node transfer.

in step 1, the user turns on all devices after work, the PC1 and the PC2 access the Internet, and all G.hn devices work in the L0 mode;

in step 2, the user stops accessing the Internet, the PC1 and the PC2 are networking to play a LAN game, in step 3, the Ethernet interface of the G.hn1 has no traffic, after 10 minutes, the G.hn1 applies to transfer the domain master node, the G.hn2 and the G.hn3 regenerate a new domain master node G.hn2 according to the domain master election rules;

in step 4, the G.hn1 applies to enter into the energy-saving mode, after the G.hn2 agrees, the G.hn1 enters into the L3 energy-saving mode, the transmitter and the receiver in the idle state are turned off;

in step 5, the user PC1 and PC1 are online again, the G.hn1 enters into the L0 state, the G.hn1 transfers the domain master to the G.hn1 according to the preset G.hn1 domain master priority rules.

The third application scenario—domain master node offline and back online.

In step 1, the user turns on all devices after work, the PC2 and the PC2 access the Internet, and all the G.hn devices work in the L0 state;

in step 2, the user stops accessing the Internet, and prepares the PC1 and the PC2 networking to play a LAN game, and turns off the HGW and powers down the G.hn1;

in step 3, the G.hn2 and the G.hn3 detect that the G.hn1 is offline, and regenerate a new domain master node G.hn2 according to the domain master election rules;

in step 4, the user is ready to re-access the Internet, turns on the HGW and powers on the G.hn1, the G.hn1 enters into the L0 mode, the G.hn2 transfers the domain master node to the G.hn1 according to the preset G.hn1 domain master priority rules.

The embodiment of the present document provides a G.hn domain master node energy-saving scenario in which G.hn devices are used to interconnect terminal devices into a home network in the home environment. The embodiment of the present document can be used to make the G.hn domain master node achieve the energy-saving purpose based on the traffic.

Figure 6:
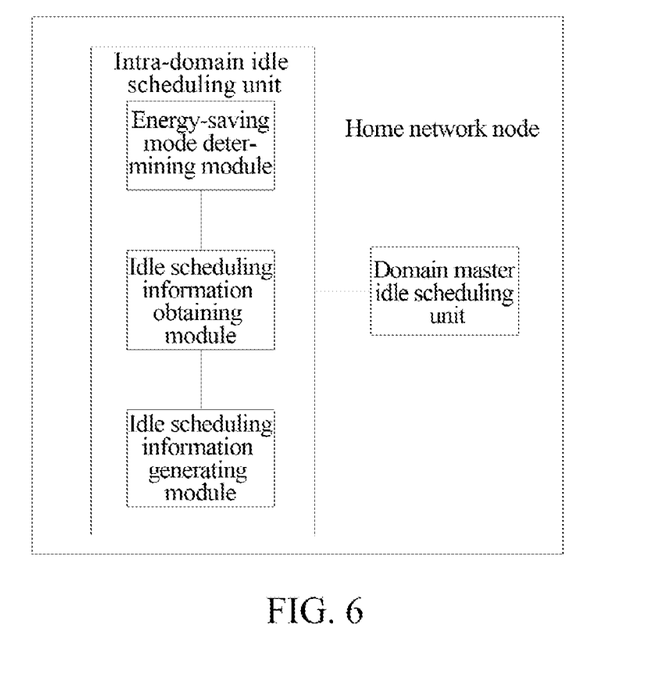
FIGS. 6-8 are schematic diagrams of module structures of a home network node in accordance with an embodiment of the present document.

To achieve the abovementioned method, the embodiment of the present document further provides a home network node, as shown in FIG. 6, the home network node comprises:

an intra-domain idle scheduling unit, configured to: when the home network node is a domain master node, perform an idle scheduling on intra-domain ordinary nodes according to an idle scheduling policy;

a domain master idle scheduling unit, configured to: when the home network node is a domain master node, when determining that all intra-domain ordinary nodes are in the energy-saving mode according to the idle scheduling information of all the intra-domain ordinary nodes, make the domain mater node enter into the energy-saving mode, and when all intra-domain ordinary nodes are in the idle state, make the domain master node be in the idle state.

In another embodiment, the intra-domain idle scheduling unit comprises:

an energy-saving mode determining module, configured to: determine the energy-saving mode of an intra-domain ordinary node currently to be scheduled;

an idle scheduling information obtaining module, configured to: obtain idle scheduling information, which is valid for a plurality of times, of intra-domain ordinary nodes which are in the energy-saving mode;

an idle scheduling information generating module, which is configured to: generate idle scheduling information of the intra-domain ordinary node to be scheduled according to the obtained idle scheduling information.

Preferably, the idle scheduling information of the intra-domain ordinary node to be scheduled synchronizes the idle state of the intra-domain ordinary node to be scheduled with the idle state of intra-domain ordinary nodes that are already in the same energy-saving mode.

Preferably, when determining that the energy-saving mode of the intra-domain ordinary node to be scheduled is the idle mode, and there is no idle scheduling information of the intra-domain ordinary nodes that are in the idle mode, and the idle scheduling information of the intra-domain ordinary node to be scheduled makes the intra-domain ordinary node to be scheduled be in the active state, intra-domain ordinary nodes which are already in the low-power mode are also in the active state.

As described above, the energy-saving mode comprises the low-power mode (L2) and the idle mode (L3), and the domain master idle scheduling unit is configured to: when determining that all the intra-domain ordinary nodes are in the low-power mode (L2) and the idle scheduling information is valid for a plurality of times, make the domain master node enter into the low-power mode;

when determining that the intra-domain ordinary nodes are in the idle mode (L3) and the idle scheduling information is valid for a plurality of times, make the domain master node enter into the idle mode;

when determining that part of the intra-domain ordinary nodes are in the low-power mode (L2), the rest intra-domain ordinary nodes are in the idle mode (L3) and the idle scheduling information is valid for a plurality of times, make the domain master node enter into the low-power mode.

Figure 7:
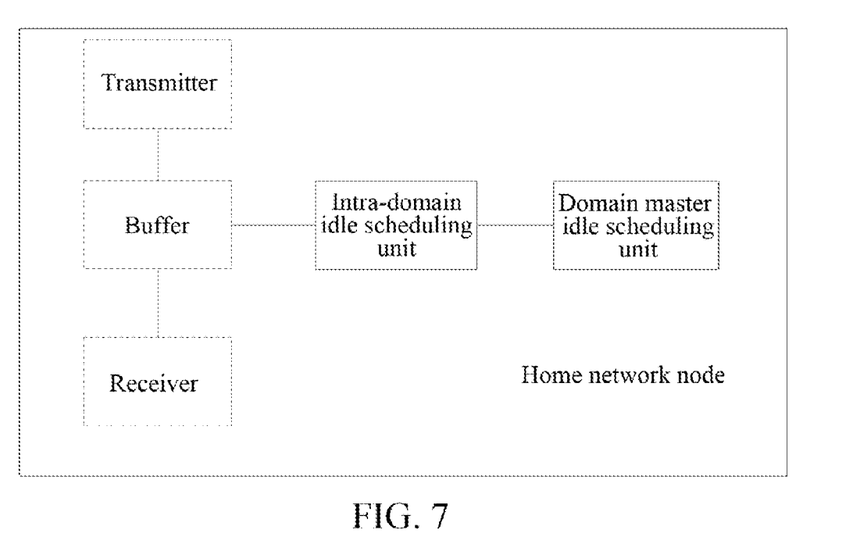

As shown in FIG. 7, the home network node further comprises a receiver and a transmitter, when the home network node (including the intra-domain ordinary nodes and the domain master node) is in the idle state, the receiver and the transmitter are turned off or only the transmitter is turned off.

The home network node further comprises buffers, which are configured to: when the home network node is the domain master node, buffer downlink data during the period that the transmitter of the domain master node is turned off or data sent to the nodes which are in the idle state and whose receivers are turned off.

Figure 8:
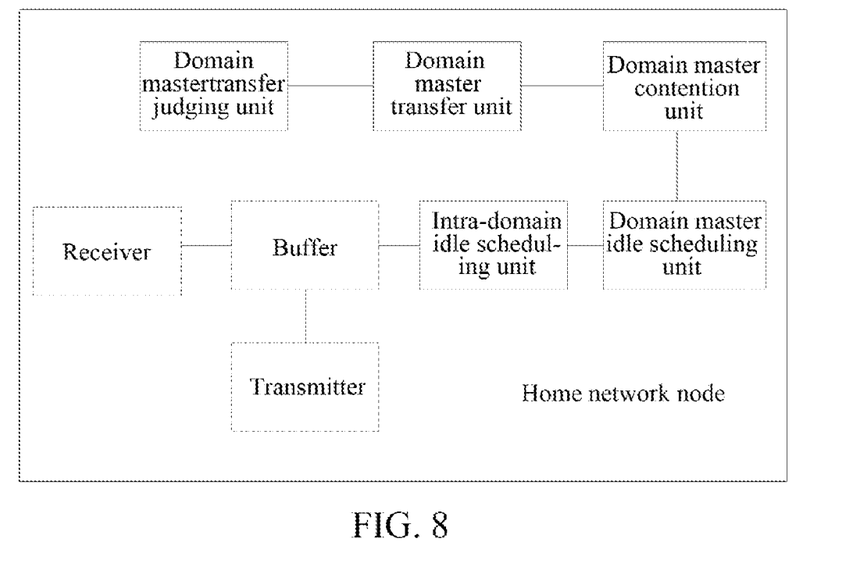

As shown in FIG. 8, the home network node further comprises: a domain master transfer unit, which is set to: when working as a domain master node and meeting the domain master transfer condition, transfer the domain master node;

a domain master transfer judging unit, which is configured to: judge whether the domain master transfer condition is met.

The domain master transfer condition refers to that the traffic of an Ethernet interface within a predetermined time period is less than a predetermined threshold.

The home network node further comprises: a domain master contention unit, which is set to: contend for the domain master node according to the domain master contention rule based on the triggering of the domain master contention event, and the domain master contention event comprises that the domain master node is offline, the former domain master node is online again, or the former domain master node transfers from the energy-saving mode to the non-energy-saving mode.

The embodiment of the present document provides an energy-saving mechanism applied to the domain master node, the domain master node performs an idle scheduling on intra-domain ordinary nodes according to the idle scheduling policy, and the domain master node enters into the idle state when all the intra-domain ordinary nodes enter into the idle mode, which can reduce power consumption of the domain master node, meet the energy-saving requirements, improve efficiency of the idle scheduling and enhance the energy-saving effect in the idle mode on the premise of meeting the function of the domain master node.

In addition, if the domain master node does not participate in the communication, the domain master node transfer can be performed to enter into the idle state. The present document further discloses the state of the transmitter, the receiver and the buffer in the energy-saving mode, and achieves the purpose of saving energy by controlling the state of the transmitter and the receiver, thus avoiding the problem that traffic packets are discarded in the energy-saving state, and further improving the home network.

The above description is only for preferred embodiments of the present document, and is not intended to limit the protection scope of the present document.

It should be noted that the abovementioned embodiments are used to describe rather than limit the present document, and those skilled in the art may design alternative embodiments without departing from the scope of the appended claims. Various component embodiments of the present document may be implemented in hardware, or implemented as software modules running on one or more the processor, or implemented as combinations thereof. Those skilled in the art should understand that microprocessors or digital signal processors (DSPs) may be used in practice to implement some or all of the functions of some or all of the components in the device according to the embodiment of the present document. The present document may also be implemented as some or all device or device programs (such as the computer programs and computer program products) executing the method described herein. Such programs implementing the present document may be stored in a computer readable media, or may have the form of one or more signals. Such signals can be downloaded from the Internet website, or provided on a carrier signal, or provided in any other form.

Those skilled in the art can appreciate that modules in the device of the embodiments can be adaptively changed and provided in one or more devices different from the present embodiment. Modules, units, or components in the embodiments can be combined into one module, unit or component, and in addition, they can be divided into a plurality of sub-modules, sub-units or sub-components. Except that at least some of these features and/or processes or units are mutually exclusive, any combinations thereof can be used to combine all the processes or units of any method or device as well as all the features disclosed in the present specification (including the appended claims, abstract and accompanying drawings). Unless otherwise expressly stated, each feature disclosed in this specification may be replaced with alternative features providing the same, equivalent or similar purposes. Admittedly, the above conversion modes are within the protection scope of the present application. It also should be noted that, the first, the second, etc. used herein do not denote any order, they are only used to indicate different subjects or objects.

INDUSTRIAL APPLICABILITY

The embodiment of the present document can reduce power consumption of a domain master node, meet energy-saving requirements, improve efficiency of an idle scheduling and enhance the energy-saving effect in the idle mode on the premise of meeting the function of the domain master node.

What is claimed is:

1. An idle scheduling method, wherein, the method comprises:
   a domain master node performing an idle scheduling on intra-domain ordinary nodes according to an idle scheduling policy;
   when the domain master node determines that all the intra-domain ordinary nodes are in an energy-saving mode based on idle scheduling information of all the intra-domain ordinary nodes, the domain master node entering into the energy-saving mode, and when all the intra-domain ordinary nodes are in an idle state, the domain master node being in the idle state;
   wherein, the domain master node performing an idle scheduling on the intra-domain ordinary nodes according to the idle scheduling policy comprises:
   determining the energy-saving mode of an intra-domain ordinary node to be scheduled;
   obtaining idle scheduling information, which is valid for a plurality of times, of intra-domain ordinary nodes which are already in the energy-saving mode;
   generating idle scheduling information of the intra-domain ordinary node to be scheduled according to the obtained idle scheduling information; wherein, the idle scheduling information of the intra-domain ordinary node to be scheduled synchronizes the idle state of the intra-domain ordinary node to be scheduled with the idle state of intra-domain ordinary nodes in the same energy-saving mode;
   wherein, the energy-saving mode comprises a low-power mode and an idle mode; and, when a domain master node determines that all the intra-domain ordinary nodes are in the energy-saving mode according to the idle scheduling information of all the intra-domain ordinary nodes, the domain master node entering into the energy-saving mode, and when all the intra-domain ordinary nodes are in the energy-saving mode, the domain master node being in the idle state, comprises:
   when determining that all the intra-domain ordinary nodes are in the low-power mode and the idle scheduling information is valid for a plurality of times, the domain master node entering into the low-power mode;
   when determining that all the intra-domain ordinary nodes are in the idle mode and the idle scheduling information is valid for a plurality of times, the domain master node entering into the idle mode;
   when determining that part of the intra-domain ordinary nodes are in the low-power mode, and rest of the intra-domain ordinary nodes are in the idle mode and the idle scheduling information is valid for a plurality of times, the domain master node entering into the low-power mode.

2. The method of claim 1, wherein, when determining that the energy-saving mode of the intra-domain ordinary node to be scheduled is the idle mode, and there is no idle scheduling information of intra-domain ordinary nodes in the idle mode, and when the idle scheduling information of the intra-domain ordinary node to be scheduled makes the intra-domain ordinary node to be scheduled be in an active state, intra-domain ordinary nodes which are already in a low-power mode are also in the active state.

3. The method of claim 1, wherein, the domain master node and intra-domain ordinary nodes comprise receivers and transmitters, when being in the idle state, the domain master node and the intra-domain ordinary nodes turn off the receivers and the transmitters or only turn off the transmitters.

4. The method of claim 1, wherein, the domain master node uses buffers to buffer downlink data during a period that the transmitter of the domain master node is turned off or data sent to the intra-domain ordinary nodes which are in the idle state and whose receivers are turned off.

5. A home network node, wherein, the home network node comprises:
   an intra-domain idle scheduling unit, configured to: when the home network node is a domain master node, perform an idle scheduling on intra-domain ordinary nodes according to an idle scheduling policy; and
   a domain master idle scheduling unit, configured to: when the home network node is a domain master node, when determining that all the intra-domain ordinary nodes are in an energy-saving mode according to idle scheduling information of all the intra-domain ordinary nodes, make the domain mater node enter into the energy-saving mode, and when determining that all the intra-domain ordinary nodes are in an idle state, make the domain master node be in the idle state;
   wherein, the intra-domain idle scheduling unit comprises:
   an energy-saving mode determining module, configured to: determine the energy-saving mode of an intra-domain ordinary node currently to be scheduled;
   an idle scheduling information obtaining module, configured to: obtain idle scheduling information, which is valid for a plurality of times, of intra-domain ordinary nodes which are already in the energy-saving mode;
   an idle scheduling information generating module, which is configured to: generate idle scheduling information of the intra-domain ordinary node to be scheduled according to the obtained idle scheduling information;
   wherein, the idle scheduling information of the intra-domain ordinary node to be scheduled synchronizes the idle state of the intra-domain ordinary node to be scheduled with the idle state of intra-domain ordinary nodes that are already in the same energy-saving mode;
   wherein, the energy-saving mode comprises the low-power mode and the idle mode, and the domain master idle scheduling unit is configured to:
   when determining that all the intra-domain ordinary nodes are in the low-power mode and the idle scheduling information is valid for a plurality of times, make the domain master node enter into the low-power mode;
   when determining that all the intra-domain ordinary nodes are in the idle mode and the idle scheduling information is valid for a plurality of times, make the domain master node enter into the idle mode;

when determining that part of the intra-domain ordinary nodes are in the low-power mode, rest of the intra-domain ordinary nodes are in the idle mode and the idle scheduling information is valid for a plurality of times, make the domain master node enter into the low-power mode.

6. The home network node of claim 5, wherein, when determining that the energy-saving mode of the intra-domain ordinary node to be scheduled is an idle mode, and there is no idle scheduling information of intra-domain ordinary nodes in the idle mode, and the idle scheduling information of the intra-domain ordinary node to be scheduled makes the intra-domain ordinary node to be scheduled be in an active state, intra-domain ordinary nodes which are already in a low-power mode are also in the active state.

7. The home network node of claim 5, wherein, the home network node further comprises a receiver and a transmitter, when the home network node is in the idle state, the receiver and the transmitter are turned off or only the transmitter is turned off.

8. The home network node of claim 5, wherein, the home network node further comprises buffers, which are configured to: when the home network node is the domain master node, buffer downlink data during a period that the transmitter of the domain master node is turned off or data sent to intra-domain ordinary nodes which are in the idle state and whose receivers are turned off.

9. The home network node of claim 5, wherein,
the home network node further comprises:
a domain master transfer unit, which is configured to: when working as the domain master node and meeting a domain master transfer condition, transfer the domain master node;
a domain master transfer judging unit, which is configured to: judge whether the domain master transfer condition is met.

10. The home network node of claim 9, wherein, the domain master transfer condition refers to that a traffic of an Ethernet interface within a predetermined time period is less than a predetermined threshold.

11. The home network node of claim 5, wherein, the home network node further comprises: a domain master contention unit, which is configured to: contend for the domain master node according to a domain master contention rule based on triggering of a domain master contention event, and the domain master contention event comprises that the domain master node is offline, a former domain master node is online again, or the former domain master node transfers from the energy-saving mode to a non-energy-saving mode.

* * * * *